Nov. 2, 1948.  B. R. F. KJELLGREN ET AL  2,452,576
METHOD OF GROWING CRYSTALS
Filed Nov. 10, 1945

INVENTOR.
BENGT R. F. KJELLGREN
HANS JAFFE
BY Ray A. Gehr
ATTORNEY

Patented Nov. 2, 1948

2,452,576

UNITED STATES PATENT OFFICE 2,452,576

METHOD OF GROWING CRYSTALS

Bengt R. F. Kjellgren, University Heights, and Hans Jaffe, Cleveland Heights, Ohio Application November 10, 1945, Serial No. 627,800

10 Claims. (Cl. 171—327)

This invention relates to the growing of crystals useful in the construction of piezoelectric, optical and other apparatus. The invention in one aspect relates particularly to the growth of crystals of the P-type and in another aspect is applicable to the growth of crystals of various types, including the P-type. Accordingly, for convenience in presentation, the invention in both its aspects may be described and specifically exemplified as applied to P-type crystals.

The term crystals of the P-type, as used herein applies to primary ammonium phosphate ($NH_4H_2PO_4$) and all other crystalline materials isomorphic with it. The habit of the P-type crystal is a combination of a tetragonal prism and bipyramid, elongated parallel to the axis of the prism.

In the growing of crystals from a solution the crystallization can be effected by gradual evaporation of the salt solution or by lowering the temperature of the solution or by both of these expedients combined, so as to maintain a suitable condition of super-saturation favoring crystallization. A method of producing crystals which has had notably successful commercial use is disclosed in the patent to Kjellgren, Reissue No. 19,697. In this method seed crystals or pieces of crystalline material are planted in the solution and the container is rocked to cause the solution to flow back and forth in relation to the said crystals while the temperature of the solution is progressively lowered at a suitable rate to effect the desired crystallization. The temperature must be reduced slowly enough so that the degree of supersaturation will not become high enough to cause spontaneous seed formation or parasitic growth. Although in the Kjellgren patented method the back and forth flow of the solution increases the rate of crystallization yet a period of many weeks may be required to complete the growth of one planting. Hence the time element involved in the growth of crystals is a major factor affecting plant capacity and cost of production.

The primary object of this invention is to provide a method capable of growing clear, sound crystals more rapidly and at lower cost than is possible by prior methods.

A second object of the invention is the provision of a method of growing crystals of the P-type by which the amount of growth in different directions can be controlled.

It has been known that certain crystal types may have their distinctive crystal habits modified by specific conditioning of the solution in which the crystal is grown. One type of such conditioning is based upon the presence and control of specific contaminants in the growing solution that act as inhibitors and another type is based upon control of the pH value of the growing solution.

In the first of the two types of conditioning the foreign additions or contaminants in some cases have a differential inhibiting effect upon the growth on different faces of the crystal, perhaps by being adsorbed on those faces. Thus it has been known for more than one hundred years that the addition of urea will cause crystals of sodium chloride to assume the shape of octohedra instead of the usual cube. This has been explained as an inhibition of growth on the pyramid faces of the crystal. See, for instance, W. G. France, "Adsorption and crystal habit modification," in J. Alexander, Coloid Chemistry, N. Y., 1944, vol. 5, page 447.

Also, the orthorhombic crystal potassium sulfate ($K_2SO_4$) has been subjected to extensive studies of growth inhibition by H. E. Buckley. See Zeits. f. Kristallographie, vol. 88, page 381, 1934; vol. 91, page 375, 1935. Buckley found that different types of inhibiting agents will cause major inhibition on different sets of faces of this crystal. For instance, inorganic ions added to the solution, in particular the dithionate ion $S_2O_6^{--}$, will inhibit growth on the two c faces and hence lead to growth of tablets with their thickness parallel to the c axis.

Other crystals investigated by Buckley are the isomorphic crystals potassium perchlorate ($KClO_4$) and potassium permanganate ($KMnO_4$). In both of these crystals growth inhibition on the c faces is obtained by addition of the bichromate ion $Cr_2O_7^{--}$.

As illustrative of the type of solution conditioning involving control of the pH of the growing solution, the piezoelectric crystal lithium sulfate monohydrate may be considered. The habit of this monoclinic crystal is a pair of parallel faces termed the a faces, in combination with a zone of faces inclined to said a faces, and parallel to the c axis, with some additional minor faces. The axes and faces of the lithium sulfate crystal are here defined in terms of the unit cell edges as determined by G. E. Ziegler Zeits. f. Kristall. v. 89, page 456, 1934.

It has been known that well formed crystals of lithium sulfate monohydrate having considerable extension in all directions can be grown from an acid solution of this salt, whereas crystals grown from a neutral or alkaline solution tend to form plates or sheets parallel to the *a* faces. We have found that considerable growth perpendicular to the *a* faces is obtained in solutions whose pH is about 5.3 or less, whereas the sheet-like habit is observed with a pH of 5.9 or higher. Insofar as the present invention is concerned it is unimportant whether this pronounced change in crystal habit occurring with a moderate change of pH between the values 5.3 and 5.9 is due to a direct action of the acidity on the crystallizing matter or is due to some minute impurities present even in chemically pure lithium sulfate and depending on the acidity for their effect on the crystal habit.

The present applicants have discovered, it is believed for the first time, that the P-type crystals are subject to such inhibiting action by certain foreign additions and that by the use of such inhibitors it is possible to modify the habit of the P-type crystal in a manner advantageous in connection with the practical utilization of these crystals. Specifically, such foreign addition agents include iron, aluminum, chromium and barium. These agents control the lateral growth of crystalline material by limiting the amount of material which is deposited in the directions of the X and Y (or *a* and *b*) axes, thus causing substantially all of the salt crystallized from the solution to be deposited as growth material along the Z (or *c*) axis. In addition the agents affect the amount of taper of the crystals toward its ends.

The present applicants have also made the further highly important discovery that in the case of certain of the crystal types, including P-type, which are subject to the above noted inhibiting action resulting from suitable conditioning of the growing solution, the growth inhibition makes it possible in the growing process to maintain in the solution a degree of supersaturation, without spontaneous formation of crystal seeds or parasitic growth, far higher than is possible when the additions are omitted. The higher degree of supersaturation thus made possible results in a much higher rate of growth without any deleterious effect on the quality of the crystal produced.

In presenting the novel subject matter of the present application as exemplified in the growth of P-type crystals use may be made of a method of growing P-type crystals which has been devised by two of the present applicants (Messrs. Kjellgren and Malone), and which utilize the fundamental principles of the Kjellgren method disclosed in the above noted reissue Patent No. 19,697.

To facilitate presentation of the Malone-Kjellgren crystal growing method and the subject matter of the present application, reference is had to the accompanying drawings.

Figure 1:
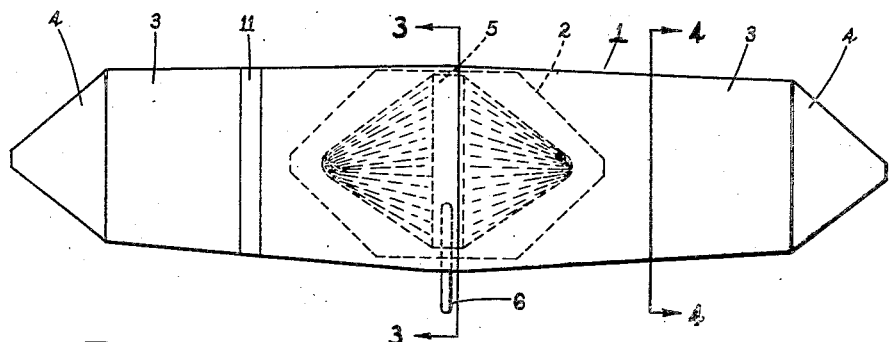
Fig. 1 is a side elevation of a P-type crystal as grown by the Malone-Kjellgren method and in accordance with the present invention.
Figure 3:
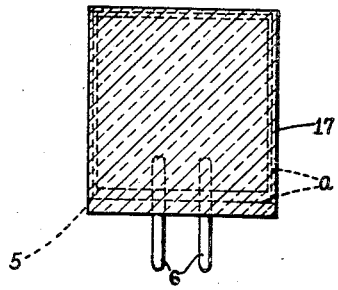
Fig. 3 is a transverse section on the line 3—3 of Fig. 1.
Figure 2:
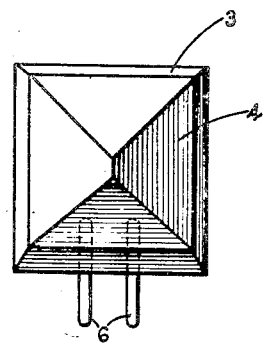
Fig. 2 is an end elevation of the crystal shown in Fig. 1.
Figure 4:
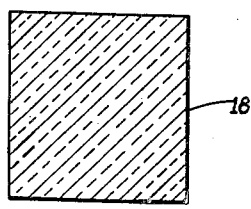
Fig. 4 is a transverse section on the line 4—4 of Fig. 1.

The crystal shown in Fig. 1 and designated as an entirety by the numeral 1, consists of a seed crystal 2, prism sections 3, 3 and pyramidal end sections 4, 4.

Figure 5:
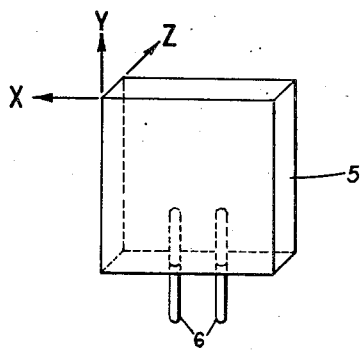
Fig. 5 is an isometric view of a crystalline seed plate used to prepare a seed crystal which in turn is used to grow the crystal shown in Fig. 1.

In the production of such a P-type crystal in accordance with the Malone-Kjellgren method, a seed plate 5 (Figs. 5 and 6) is cut from a previously grown crystal with the orientation indicated in Fig. 5 by the axis arrows X, Y, Z. Holes are drilled in one of the narrower faces of the plate 5 to permit attachment of supporting pins 6 which may have their projecting ends inserted in holes in a support arranged on the bottom of the tray or container in which the crystal is to be grown. In practice a considerable number of such seed plates are disposed in a single solution container which is arranged to be tipped or rocked back and forth to cause a back-and-forth flow of solution relative to the seed plates. The plates preferably are arranged so that the flow of the solution is parallel to the major faces of the plates, i. e. at right angles to the Z axis.

The seed plates having been arranged as specified in the tray, the latter is filled to a suitable level with a hot water solution of the salt to form the crystalline material and by gradually lowering the temperature of the solution while rocking the tray crystalline growth is caused to produce the seed crystal 2 in accordance with the P-type crystal habit. On reference to Fig. 6 it will be noted that the seed crystal 2 is made up of the seed plate 5, short prism sections 7, 7 and pyramidal end sections 8, 8. The crystalline growth which produces seed crystal 2, in accordance with the P-type crystal habit, is less laterally, i. e. in the direction of X, Y axes, than in the direction of the Z axis. The latter growth, building up on the major faces of the seed plate 5 tends to be unsound or mushy (as indicated at 9) except near the peripheries of the seed plate. In these peripheral regions, as at 10 in Fig. 6, the growth is clear and sound; and under the influence of the specified back-and-forth flow of the solution this sound growth develops inwardly toward the Z axis of the crystal to form a solid crystalline shell of pyramidal shape as indicated in Fig. 6.

Figure 6:
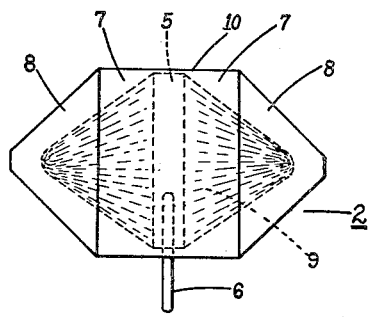
Fig. 6 is a side elevation of the seed crystal referred to in connection with Fig. 5.

In accordance with the Malone-Kjellgren procedure, when the pyramidal shells or end portions of the growing crystal have fully formed, as shown in Fig. 6, the crystals, which are to serve as seeds, are picked from the tray and sorted to eliminate imperfect crystals having unsound enclosing shell structures. The remaining sound seed crystals 2 are next replanted in a growing tray arranged so that the back-and-forth flow of salt solution will be parallel to the Z axis instead of parallel to the X and Y axes. Starting with a suitable hot solution a growing cycle is carried out by gradually lowering the temperature of the solution while rocking the tray to effect growth of the crystal to a stage such as is illustrated in Fig. 1 of the drawing.

Under the practice of the Malone-Kjellgren method the P-type crystals, both the seed crystal and the large crystal, were grown in salt solutions prepared by dissolving in distilled water salt chemically pure according to American Chemical Society standards; but the practice of the present invention significantly departs from the earlier procedure by having definitely present in the P-type salt solution a foreign agent which has been found both to modify the habit of the crystal by restricting its lateral growth and to make possible a growth cycle differing radically with respect to the time element.

For purposes of further explanation it will be assumed that crystals of primary ammonium phosphate are to be produced in accordance with the present invention. The drawing properly represents such crystals. The solution from which the said crystals are to be grown is prepared by dissolving primary ammonium phosphate salt in hot distilled water until a specific gravity of about 1.1963 at 60° C., is obtained. The addition agent, iron for example, is then added to the solution in the following manner: iron filings are dissolved in phosphoric acid and water and the resulting solution is added to the salt solution until it contains from 0.06 to 0.12 gram of iron per liter of solution. Larger amounts of iron may be added but amounts within the range stated give satisfactory results. After addition of the iron solution to the salt solution, the acidity of the latter is checked and its pH adjusted (if necessary) to a value within the range of about 3.9 to 4.1. A more acid condition, that is, a pH less than 3.9, may also be employed. However, the upper limit of the permissible pH value is more critical as the iron addition has an increasing tendency to precipitate ferric phosphate as the pH value is increased above 4.1.

The solution prepared as stated may be poured into the pre-heated tray at about 43° C. Rocking of the tray being then started, the temperature of the tray and solution may be allowed to drop rapidly until it reaches about 41° C. At this point the rate of cooling of the solution is reduced by supplying heat to the tray to partially compensate for the heat loss therefrom until the solution cools to about 40.5° C. Suitable automatic temperature control apparatus may then be used to control the amount of heat supplied to the tray to cause the temperature of the solution to drop at substantially a uniform rate of about 1.7° to 2° C. per day until seed crystals, such as shown in Fig. 6, are produced, the time required for this being about 4 to 6 days, for a seed plate about 1⅝″ square.

The seed crystals thus produced are picked and inspected. If they do not have a smooth hard surface, especially on the pyramidal faces, they are discarded since experience has shown that seed crystals which do not have such smooth hard surfaces are apt to produce badly flawed crystals. The flawless seeds are replanted in another tray, using the same pins 6 for supporting them upright, but with the direction of the Z axis of the seed parallel to the direction of the solution flow. To effect growth of the seed crystals to the desired large size a salt solution is employed differing slightly from that used for growing the seed crystals. This new solution is formed by dissolving primary ammonium phosphate salt in hot distilled water until a solution is obtained with a specific gravity of about 1.213 at 60° C. Iron is then added to the solution as has been described in connection with the growing of the seed crystals but in a lesser amount, 0.06 to 0.08 gram of iron per liter of solution being sufficient. Larger quantities of the iron addition can be used but care should be exercised since excessive amounts of the addition agent tend to unduly taper the prism section of the crystal produced. The pH of the solution should be the same as for growing the seed crystals, that is, within the range of about 3.9 to 4.1, and phosphoric acid may be added to correct for excessive alkalinity in the solution, which may be caused by use of commercial salt containing some secondary ammonium phosphate.

With the growing tray containing the seed crystals at a temperature of about 46° C., the new growing solution is introduced at a temperature of about 53° C. and the temperature of the solution is dropped rapidly to 49° C., at which crystal growth begins. At this point the control of the heat supply is preferably given over to automatic apparatus designed to lower the temperature of the solution at the rate of about 0.4° C. per day for 3 days, 0.6° C. per day for 3 days, 0.8° C. per day for 3 days, 1° C. per day for about 3 days, and about 1.2° C. per day for about 15 days, until the solution temperature reaches about 22° C. At this time the seed crystals have grown into crystals such as that illustrated in Fig. 1 of the drawing and the growing tray is opened and the crystals picked from the solution.

The time schedules which have been given for the lowering of the salt solution temperature both in the growing of the 1⅝″ square seed crystals and in the growing of the corresponding large crystals from the seeds will in practice have to be modified according to the cross section area of the crystals to be produced, i. e. the growing time must be increased as the cross section of the crystal is increased, but in any event the time schedules will differ radically from the corresponding schedule which it would be necessary to employ, and which prior to the present invention were employed, in the growth of primary ammonium phosphate crystals without the addition of iron or other equivalent foreign agent. Thus the growth of the seed crystals which require from 4 to 6 days when grown in accordance with the present invention, required at least 10 days when produced by the prior methods, although it is to be noted that the time factor, in the growth of the seed crystals, is importantly affected by the direction of the solution flow in relation to the Z axis of the crystal. Similarly the growth of the large crystals which in accordance with the present invention and as above described, requires 27 days, in the case of the prior procedures without the use of iron or other addition agent, required about 55 days. This means that a crystal growing plant of given size can double its output by use of the improved method employing foreign addition agents as described. In the growth of crystals by the Kjellgren patented method, one of the limiting factors is the critical rate of stirring at which the solution will be subject to spontaneous crystallization at a given oversaturation. The present method of increasing the stability of the solution against spontaneous breakdown may be used either to increase the oversaturation maintained during growth or to increase the rate of stirring, or a combination of both. Generally the difficulties to be overcome are the formation of flaws and spontaneous crystallization. Faster stirring, short of the point of causing spurious crystallization, will reduce the tendency to flaw formation. The present invention will usually involve an increase in the rate of stirring, thereby distributing the gains of the new method to the best advantage. The described advantages of the present method are realized not only in the growth of P-type crystals but also of all crystal types to which the method is applicable.

A further effect of the addition agent upon the growth of P-type crystals is a substantial diminution of the crystalline growth laterally, that is, in the direction of the X and Y axes.

This effect makes it possible by the present method to grow crystals capable of more economic use of the crystallized material for specific purposes. Thus a chief use of P-type crystalline material for piezoelectric and optical uses is in the form of Z-cut shear plates such as is indicated at 11 in Fig. 1. Such plates can readily be produced with a minimum wastage of crystalline material by growing seed crystals such as are shown in Fig. 6 starting with seed plates 5 approximately of the same size, in the directions of the X and Y axes, as the crystalline plates which it is desired to produce. Since the prism sections of the large crystals may have a small taper, as shown in Fig. 1, the use of the seed plates of approximately the size of the crystal plates which it is desired to produce results in the production of a prism section which at its smaller ends is of approximately the size of the seed plate, the relatively small lateral growth which occurs in the production of the large crystal corresponding approximately to the taper of the prism section thereof. In other words the improved method employing the addition agents makes it possible to grow P-type crystals having lateral dimensions substantially equal to the major dimensions of rectangular crystal plates of any specified size.

The advantage residing in this result is not merely that waste of crystalline material is minimized in the cutting up of the grown crystals; for in addition there is secured the distinct advantage in connection with the growing of the large crystals that nearly the entire crystalline growth is in the direction of the Z axis so that the growing capacity of a given salt solution is utilized to a maximum degree in producing usable crystalline material and a plant of a given size for growing P-type crystals realizes an increase of useful output in addition to that due to reduction of growing time.

As has been noted, in the case of P-type crystals the size of the seed crystal used in carrying out the accelerated crystallization is chosen about equal to the extension of the crystal to be grown in the directions of the X and Y axes because it is the growth in these directions that is inhibited. It will be understood that the same principle applies in the case of other crystals grown by the present method. That is to say, to attain a crystal of desired size, seed crystals must be used having extension in the directions of inhibited growth that takes account of the slight or negligible growth in those directions. To attain seed crystals of desired size it will be apparent that they should be composed of crystal grown in solution not conditioned to inhibit growth.

The iron is added to the growing solution preferably as a ferric phosphate as has been described but it may also be added as ferric chloride, ferric nitrate or other simple ferric salt. Ferric sulfate and ferric ammonium sulfate also produce the described effect on crystal growth, but they materially reduce the electric resistivity of the crystals. In all cases the purpose is to introduce the ferric ion into the solution.

Certain other ions which will inhibit the growth of ammonium phosphate crystals may be added to the solution by themselves or with the iron. Such ions are trivalent aluminum and trivalent chromium, and the barium ion.

The quantities of aluminum and chromium which are used should be of the same order of magnitude as the described quantities of iron.

As with the iron addition, aluminum and chromium may be added as metals, which oxidize to the desired ions by the acid action of the primary ammonium phosphate in conjunction with the action of air dissolved in the solution; or they may be added in the form of a salt such as the chloride.

When crystal plates are to be produced for optical uses, aluminum is particularly suitable as addition agent since it does not color the crystal material as do iron and chromium. Also the use of barium as addition agent is not suitable for the production of high resistance piezoelectric crystals as it lowers the electrical resistance of the crystal material.

Another crystal of the P-type to which the present method of accelerated growth is applicable is primary potassium phosphate. Addition agents suitable for the potassium salt include the bivalent lead ion and all of the addition agents, with the exception of barium, above noted as suitable for use in growing primary ammonium phosphate crystals. However, account should be taken of the fact that in the case of the potassium salt the agents are generally more effective in their inhibiting action. Thus it has been found that .02 gram of chromium per liter of salt solution will inhibit growth on both the prism and pyramid faces until the solution has been cooled 12° C. below its saturation temperature; and accordingly, in order to get the desired differential inhibiting effect chromium should be added in considerably smaller amount than .02 gram per liter.

Of crystals other than those of the P-type to which the present method of accelerated growth is applicable, Rochelle salt may be given as an example. It has been noted by others that copper salts added to Rochelle salt solution will inhibit the growth on the c faces of the Rochelle salt crystals. The present applicants have confirmed this finding. For example, the addition of 1 gram of cupric carbonate to 1 liter of Rochelle salt solution saturated at 37° C. and 0.1 normal in sodium hydroxide, will cause the rate of growth along the c axis to be only about one-tenth of the rate of growth along the b axis, whereas without the addition of the cupric carbonate the growths along the b axis and the c axis are about equal.

In a typical crystallization of Rochelle salt employing the conditioning of the growing solution in accordance with the present invention, one-half gram of copper carbonate was added per liter of Rochelle salt solution and the growing was conducted otherwise in accordance with the Kjellgren patented method above identified. The growth of the Rochelle salt crystals on each c face was 15 mm.; the growth in the width direction, that is, parallel to the b axis of the crystals, amounted to about 50 mm. towards either side. A comparison growth carried out under similar conditions but without addition of copper resulted in a formation of numerous spontaneous crystals interfering with the crystals to be grown from the planted seeds; and the width growth in the comparison solution was only about 37 mm. Measurements of the specific gravity at the end of the crystallization at 21.2° C. showed 1.3008 in case of the copper addition compared to 1.2966 in the case of the comparison solution. This difference in specific gravity corresponds to an excess oversaturation equivalent to .6° C. in saturation temperature for the solution containing copper.

It will be seen therefore that the present method is applicable to the growing of Rochelle salt crystals.

Reference has already been made to the conditioning of lithium sulfate growing solutions by control of their pH, for the purposes of producing inhibited growth to carry out the present method. We have discovered that the known inhibition of growth of lithium sulfate crystals perpendicular to their $a$ faces will permit the maintenance of an increased oversaturation in the lithium sulfate growing solution, and thereby an increased rate of growth in directions parallel to the $a$ faces, in accordance with the general principle of our invention. We have found that the specific gravity of lithium sulfate solutions of pH 5.9 or higher at the end of a crystallization run was between .017 and .023 higher than the specific gravity of an equilibrium solution of identical composition and temperature, while the specific gravity of lithium sulfate solutions of pH of 5.3 or less at the end of a crystallization run was only .0005 to .01 higher than the corresponding equilibrium solution. In case of the former solutions the quoted differences in specific gravity correspond to an oversaturation of about 7 to 10% of the salt dissolved in a saturated solution, whereas for the latter, more acid solutions, the oversaturation amounts to only about 3% of the salt dissolved in saturated solution. In accordance with the higher oversaturation of the solutions of high pH, the rate of growth parallel to the $a$ faces, that is, along the $b$ and $c$ axes, was more than twice as high as in the solutions of low pH. In the latter, considerable spontaneous crystallization occurred whereas in the solutions of high pH only minor amounts of needles or crystal powder had grown spontaneously. To utilize the increased rate of lateral growth parallel to the $a$ faces it will, of course, be necessary to provide a seed plate which has extension perpendicular to the $a$ face as high or higher than the extension in this direction required of crystal plates to be cut from the grown crystal for piezo-electric or other purposes. In fact it may be necessary to make the thickness of the seed somewhat larger than the thickness of the crystal to be grown as the $a$ faces are observed to develop a taper amounting to several degrees towards the $b$ axis in crystals grown from solutions of pH above 5.9. An economical method for growing lithium sulfate crystals, in accordance with the present invention, therefore consists in first growing crystal seeds from a solution whose pH is below about 5.3 and permits ready growth perpendicular to the $a$ faces, second, cutting seed plates from such crystal, the cut being perpendicular to the $a$ face, and third, planting such seed plates in a solution whose pH is above 5.9 and restricts growth on the $a$ faces.

The described examples of crystal growth inhibition lead to crystals of significantly different geometric types. Theoretically it is possible to have four major cases of geometric relationship between the faces which show major inhibition.

Case 1.—The set of most inhibited faces may be so disposed that it can completely enclose a space. This will be the case, for instance, if there are four most inhibited faces, no two of whose intersections are parallel. This is further the case of most inhibited faces forming a parallelopipedon. Any set of equivalent faces of the cubic system completely encloses a space; it follows that all cubic crystals with any type of growth inhibitor do belong to case 1.

In case 1 the set of most inhibited faces will eventually completely enclose the growing crystals and growth will be inhibited until oversaturation has reached a point where the inhibition is overcome. The purpose of our invention is thereby lost. It follows that the invention is not applicable to crystals of the cubic system.

Case 2.—The set of most inhibited faces forms a closed crystallographic zone. By this term we understand a set of faces all of whose intersections are parallel, the number of these faces being three, with no two faces parallel, or more than three. If the set of major inhibited faces is of such a relationship the crystal will grow into a bar bounded by such a set of faces but unlimited in growth in the direction of the zone axis. The crystals of primary ammonium phosphate inhibited in their growth by iron as before described, are an example for this case.

A subdivision of case 2 is furnished by major growth inhibition on one closed zone and in addition a single face not belonging to this zone. Such a combination will lead to the growth of a crystal bar along one direction of the zone axis only.

Case 3.—Major growth inhibition takes place on two parallel planes only. In this case growth can occur in all directions parallel to the inhibited faces, and a seed crystal will grow into a plate whose thickness is essentially determined by the dimension of the seed perpendicular to the inhibited faces.

Subdivisions of case 3 are furnished by: first, combination of two parallel planes with one other plane, which will permit growth of a crystal plate toward one side only; and second, the case of two parallel planes and two planes not parallel to these and intersecting in a line not contained in the parallel planes; in this case the crystal can grow into a sector of a sheet. Neither of these minor cases is likely to be met with frequently.

Case 4.—Major growth inhibition takes place on one single plane, or two non-parallel planes, or three planes with non-parallel intersections. In this case the crystal can grow into a body which is unlimited in three directions.

It is believed that the connection between the growth inhibition and increased range of stable oversaturation observed experimentally in the described examples can be explained as follows. The spontaneous crystallization starts from a submicroscopic aggregation of the dissolved substance, being arranged substantially in accordance with the structure of the crystal. If growth inhibiting agents are present in the solution they will block the growth of this submicroscopic body on the inhibited planes. If now the set of most inhibited faces is of the relationship described above as case 2 or case 3, the dimensions of the spontaneous crystal body will remain of submicroscopic size in at least one direction. A body thus restricted in size will be subject to distortion by thermal motion of the solution and the growth of a substantial crystal from said aggregate is prevented.

On the basis of this suggested explanation it is believed that the prevent invention is more particularly applicable to growth inhibition belonging to cases 2 and 3 than to case 4.

For purpose of explanation, in the preceding paragraphs, major growth inhibition only has been considered, and minor growth inhibitions which may occur simultaneously with a major growth inhibition have been disregarded. It should also be pointed out that the conditions governing crystal growth are a combination of the crystal habit as found in the pure solution and the influence of inhibiting agents. Thus in the case of the lithium sulfate crystals grown in the presence of the ammonium ion, inhibition takes place on one pair of faces, but only to the extent of making this pair about equal in growth properties to the normally prominent pair of faces leading to growth along the common direction of intersection of these two pairs of faces. It should be understood that a growth inhibition is not absolute or total, but rather consists in a more or less pronounced slowing down of the rate of the deposition on the considered face at a given oversaturation. Corresponding to this, the addition of specified amounts of a differential growth inhibiting agent will usually not prevent spontaneous crystallization unconditionally but only up to a certain oversaturation.

It is to be understood that the various specific procedures which have been disclosed in the foregoing description are presented for the purposes of illustration and explanation and that the improved process can be carried out in various modified ways without departure from the invention as defined in the appended claims.

What is claimed is:

1. The method of growing a crystal which comprises the steps of providing a solution of the substance to be crystallized conditioned to inhibit crystal growth along at least one but not all of the axes of the crystal and to increase substantially the possible degree of supersaturation of the solution without causing spurious crystalline growth therein; introducing into the solution a seed body having extension in the directions of inhibited growth about equal to the corresponding extension of the crystal to be grown; and, for the purpose of accelerating deposition of clear crystal material on the seed body in the direction of uninhibited growth, maintaining a substantially higher degree of supersaturation in the solution than is operable for such purpose in a solution of the said substance free from the stated inhibition.

2. The method of growing a crystal which comprises the steps of preparing a seed body of crystalline material grown in a solution substantially free from growth-inhibiting agents; planting the seed body in a solution of the substance to be crystallized conditioned to inhibit crystal growth along at least one but not all of the axes of the crystal and to increase substantially the possible degree of supersaturation of the solution without causing spurious crystalline growth therein; and, for the purpose of accelerating deposition of clear crystalline material on the seed body in the direction of uninhibited growth, maintaining a substantially higher degree of supersaturation in the solution than is operable for such purpose in a solution of the said substance free from the stated inhibition.

3. The method of growing a crystal which comprises the steps of subjecting a seed body of the substance to be crystallized to a solution of such substance containing in addition to the substance an inhibiting agent capable of inhibiting crystalline growth along at least one but not all of the crystal axes of the seed body and of increasing substantially the possible degree of supersaturation of the solution without causing spurious crystalline growth therein; and, for the purpose of accelerating deposition of clear crystalline material on the seed body in the direction of uninhibited growth, maintaining a substantially higher degree of supersaturation in the solution than is operable for such purpose in a solution of the said substance free from the stated inhibition.

4. The method of growing a crystal as claimed in claim 3 in which the inhibiting action of the inhibiting agent is substantially less in all directions perpendicular to a crystal axis than along that axis.

5. The method of growing a crystal as claimed in claim 3 in which the inhibiting action of the inhibiting agent is substantially equally strong on three or more faces belonging to one zone of the growing crystal but substantially weaker on all possible faces of said crystal not belonging to said zone.

6. A method of growing a crystal as claimed in claim 1 in which the substance to be crystallized is primary ammonium phosphate.

7. A method of growing a crystal as claimed in claim 3 in which the growing solution contains primary ammonium phosphate and an inhibiting agent chosen from the group of iron, aluminum, chromium and barium.

8. A method of growing a crystal as claimed in claim 3 in which the growing solution contains primary ammonium phosphate and iron as inhibiting agent.

9. The method of growing a crystal which comprises the steps of providing a solution of the substance to be crystallized having a pH value which inhibits crystalline growth along at least one but not all of the axes of the crystal and increases substantially the possible degree of supersaturation of the solution without causing spurious crystalline growth therein; introducing into the solution a seed body having extension in the directions of inhibited growth about equal to the corresponding extension of the crystal to be grown; and, for the purpose of accelerating deposition of clear crystal material on the seed body in the direction of uninhibited growth, maintaining a substantially higher degree of supersaturation in the solution than is operable for such purpose in a solution of the said substance free from the stated inhibition.

10. The method of growing a crystal of lithium sulfate monohydrate which comprises the steps of growing a seed crystal in a solution of the sulfate having a pH value lower than about 5.3; introducing the seed so grown into a solution of the sulfate having a pH value higher than about 5.9 and thereby conditioned to inhibit crystalline growth in the direction of the a axis but not the b and c axes of the seed crystal and to increase substantially the possible degree of supersaturation of the solution without causing spurious crystalline growth therein; and, for the purpose of accelerating deposition of clear crystalline material on the seed body in the direction of uninhibited growth, maintaining a substantially higher degree of supersaturation in the conditioned solution than is operable for such purpose in a solution not so conditioned.

BENGT R. F. KJELLGREN.
HANS JAFFE.

No references cited.